(12) United States Patent
Mudigonda et al.

(10) Patent No.: US 9,385,922 B2
(45) Date of Patent: Jul. 5, 2016

(54) GENERATING EGFT NETWORK TOPOLOGIES

(75) Inventors: Jayaram Mudigonda, San Jose, CA (US); Praveen Yalagandula, San Francisco, CA (US); Jeffrey Clifford Mogul, Menlo Park, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 975 days.

(21) Appl. No.: 13/285,803

(22) Filed: Oct. 31, 2011

(65) Prior Publication Data

US 2013/0107759 A1 May 2, 2013

(51) Int. Cl.
| | |
|---|---|
| *H04L 12/28* | (2006.01) |
| *H04L 12/24* | (2006.01) |
| *H04L 12/709* | (2013.01) |
| *H04L 12/753* | (2013.01) |
| *H04J 1/16* | (2006.01) |

(52) U.S. Cl.
CPC .............. *H04L 41/12* (2013.01); *H04L 45/245* (2013.01); *H04L 45/48* (2013.01); *Y02B 60/33* (2013.01)

(58) Field of Classification Search
USPC .................. 370/254–256, 252, 386
See application file for complete search history.

(56) References Cited

U.S. PATENT DOCUMENTS

| | | | |
|---|---|---|---|
| 6,101,181 A | 8/2000 | Passint et al. | |
| 6,731,729 B2 | 5/2004 | Eng et al. | |
| 7,620,736 B2 | 11/2009 | Westfall | |
| 7,633,940 B1 | 12/2009 | Singh et al. | |
| 7,653,011 B2 | 1/2010 | Rahman et al. | |
| 7,779,148 B2 | 8/2010 | Arimilli et al. | |
| 8,358,661 B2* | 1/2013 | Armstrong et al. ........... 370/401 |
| 8,537,677 B2 | 9/2013 | Ahn et al. | |
| 2008/0008471 A1 | 1/2008 | Dress | |
| 2009/0009215 A1 | 1/2009 | Matsumoto et al. | |
| 2009/0094436 A1 | 4/2009 | Deng et al. | |
| 2009/0106529 A1 | 4/2009 | Abts et al. | |
| 2011/0085561 A1 | 4/2011 | Ahn et al. | |
| 2011/0258641 A1* | 10/2011 | Armstrong ............ G06F 13/385 719/327 |
| 2012/0020242 A1 | 1/2012 | McLaren et al. | |
| 2012/0023260 A1 | 1/2012 | Minkenberg | |

(Continued)

FOREIGN PATENT DOCUMENTS

WO    WO-9821857 A1    5/1998

OTHER PUBLICATIONS

Rodriguez, G. et al., "Exploring Pattern-Aware Routing in Generalized Fat Tree Networks", ICS'09, Jun. 8-12, 2009, pp. 276-285, Yorktown Heights, New York, USA.

(Continued)

*Primary Examiner* — John Pezzlo
(74) *Attorney, Agent, or Firm* — International IP Law Group, PLLC

(57) ABSTRACT

A method of generating a plurality of potential generalized fat tree network (GFT) topologies is provided herein. The method includes receiving parameters that specify a number of servers, a number of switches, and a number of ports in the switches. The parameters are for configuring an GFT topology. The method also includes generating a plurality of potential GFT topologies based on heuristics that favor higher bandwidth and lower latency. Generating the plurality of potential GFT topologies includes generating each level of the potential GFT topologies, recursively, and from a bottom level of a potential GFT topology to a top level.

20 Claims, 6 Drawing Sheets

(56) References Cited

U.S. PATENT DOCUMENTS

2012/0030345 A1 2/2012 Mahadevan et al.
2013/0044588 A1 2/2013 Kogge
2014/0157274 A1* 6/2014 Ballani et al. .................. 718/1

OTHER PUBLICATIONS

Mike Schlansker et al., "Ensemble Routing for Datacenter Networks," ANCS'10, Oct. 25-26, 2010, La Jolla, CA, USA, pp. 1-12, ACM.

* cited by examiner

100

300

GENERATING EGFT NETWORK TOPOLOGIES

BACKGROUND

The potential network topologies that may be created for a specific set of servers and switches are numerous. As such, there are various criteria used for selecting potential network topologies from amongst the alternatives.

Network topologies are typically tree-based, and do not provide path diversity, or high bandwidth. However, multi-path topologies, which are inherently redundant, may provide both. For example, extended generalized fat tree (EGFT) topologies typically provide a large number of paths between any two end-points, and can provide improvements in bandwidth. EGFT topologies are also referred to herein as EGFTs. However, choosing a cost-effective EGFT is challenging because the various parameters for configuration create a large design space. Further, these parameters have complex interactions amongst themselves, which makes the design space computationally complex to resolve. Generating EGFT topologies in a way that is less computationally complex would be useful in creating multipath networks with greater bandwidth.

BRIEF DESCRIPTION OF THE DRAWINGS

Certain embodiments are described in the following detailed description and in reference to the drawings, in which.

DETAILED DESCRIPTION

Researchers have proposed a wide variety of topologies for data-center networks, all with the goal of providing high bisection bandwidth at low cost. Bisection bandwidth represents the available bandwidth over all bisections of a network. However, rather than manually design networks with the goal of achieving these aims, in embodiments, EGFTs are automatically generated by reducing the design space from which these topologies are selected. For example, the set of potential EGFT topologies may be narrowed by favoring topologies with greater bandwidth. Various characteristics of this reduced set of EGFTs may be exposed to a user, who can select from them based on these characteristics.

In embodiments, potential topologies with lower latency are also favored. As used herein the term "latency" refers to the time taken for a packet to traverse from an end-host to another end-host in the worst case. Latency may be represented in terms of link hop count or switch hop count. The term "hop count" refers to the number of links traversed on a path from one end-host to another end-host in the worst case. Ignoring the considerable latency in end-host stacks, switch hops are a typical source of delay in uncongested data-center networks, such as scientific and financial computing networks. Switch hops are the number of switches traversed on a path from one end-host to another end-host in the worst case.

Figure 1:
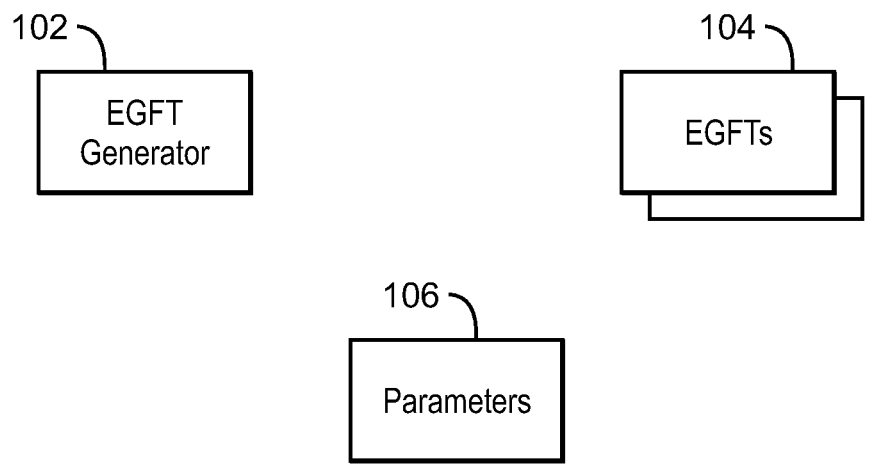
FIG. 1 is a block diagram of a system in accordance with embodiments.

FIG. 1 is a block diagram of a system 100 for generating EGFTs in accordance with embodiments. The system 100 includes an EGFT generator 102, EGFTs 104, and parameters 106. The EGFT generator 102 generates a set of EGFTs 104 based on a specified set of parameters 106.

The parameters 106 may include constraints, such as cost constraints. Other constraints may include achieving a specified bisection bandwidth, and reducing overall cost while using components from a specified list of parts. Parts may include switches with different numbers and types of ports, cables of different types and lengths, and the like. In one embodiment, the EGFT generator 102 may use heuristic techniques that reduce the search space of potential EGFTs 104 by orders of magnitude, thereby reducing the computational complexity of generating the EGFTs 104.

The EGFT generator 102 may also generate non-uniform oversubscription (NUO) networks, which provide some cost savings. However, the design space for such topologies may be reduced by considering a performance metric that is a vector rather than using bisection bandwidth, which is a scalar value. The EGFTs 104 are described in greater detail with reference to FIGS. 2A-2B.

Figure 2A:
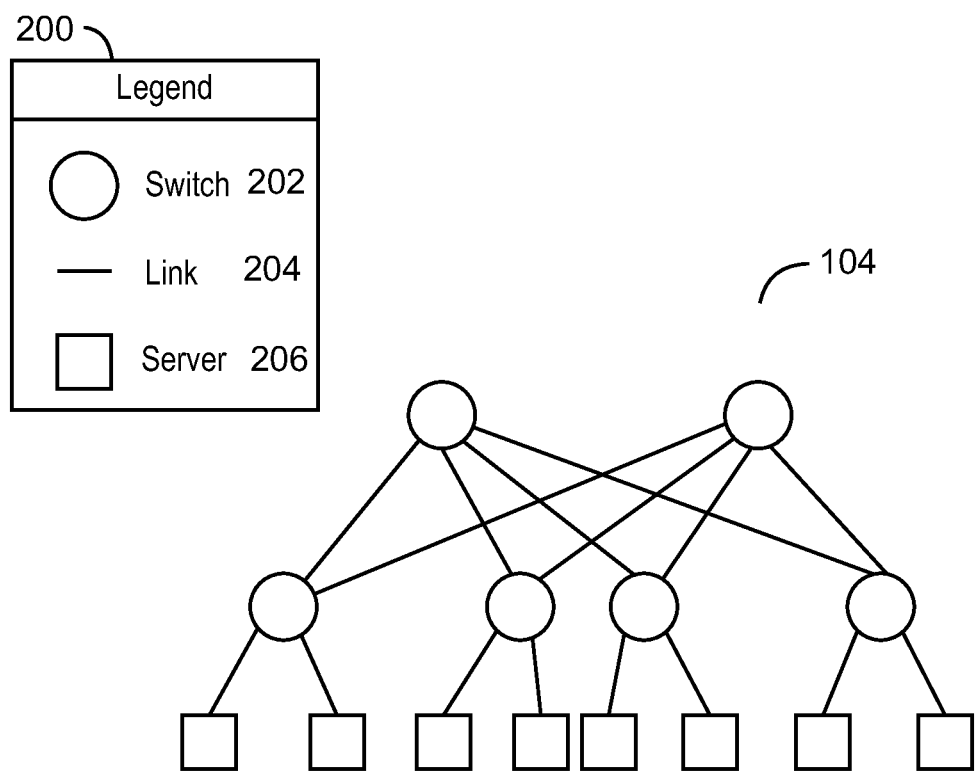
FIGS. 2A-2B are block diagrams of an extended generalized fat tree (EGFT) topology in accordance with embodiments.
Figure 2B:
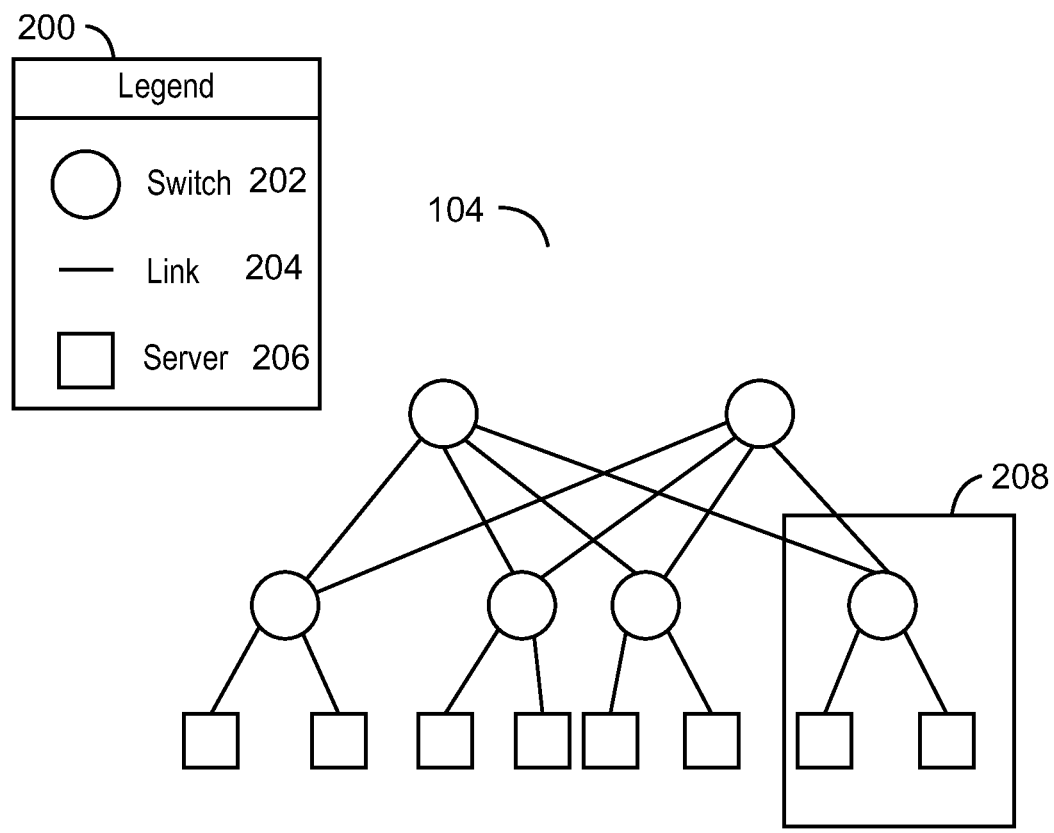

FIGS. 2A-2B are block diagrams of an example EGFT 104, in accordance with embodiments. The legend 200 describes the components of the EGFT 104. The example EGFT 104 includes 2 levels of switches 202, in communication with each other over links 204, and servers 206. The EGFT 104 may be defined recursively over a number of "levels." An EGFT with L levels consists of $C_L$ switches that interconnect $M_L$ "modules", each of which is a L−1 level EGFT itself. Each of the $C_L$ top switches connects to each of the $M_L$ L−1 EGFTs with a logical link that aggregates $K_L$ physical links. For example, as shown in FIG. 2B, a one-level module 208 may include one top switch 202 ($C_1=1$) and two servers 206 (two zero-level modules, $M_1=2$). The logical link connecting the top switch to the servers in the module 208 has one physical link, hence $K_1=1$. EGFT 104 has two levels (L=2) with two top switches ($C_2=2$) connecting to 4 one-level modules ($M_2=4$). Since each top switch has only one physical link connecting to each one-level module, $K_2$ is 1 in this example.

For clarity, the EGFT 104 is further described with reference to the symbols shown in Table 1:

TABLE 1

| SYMBOL | REPRESENTS |
|---|---|
| N | TOTAL NUMBER OF SERVERS (OR EXTERNAL CONNECTIONS) |
| R | SWITCH RADIX (PORT COUNT) |
| T | TERMINALS CONNECTED TO A SINGLE SWITCH |
| S | TOTAL NUMBER OF SWITCHES |
| L | LEVELS OF AN EGFT |
| K | LINK BANDWIDTH |
| W | TOTAL NUMBER OF LINKS IN A NETWORK |
| C | NUMBER OF TOP SWITCHES IN A TREE |
| O | OVERSUBSCRIPTION RATIO |
| ~K | LINK BANDWIDTH VECTOR |
| ~C | TOP SWITCHES IN A TREE VECTOR |

A level I EGFT connects $M_I$ of I−1 level EGFTs with $C_I$ switches 202. Each top switch has a $K_I$-wide connection to each of the I−1 level EGFTs. In other words, $K_I$ is the Link Aggregation (LAG) factor. A level 1 EGFT has just one switch ($C_1=1$), with $M_1$ servers directly connected to the switch with $K_1=1$ (i.e., unit bandwidth) links. Note that the level-1 EGFT can be generalized further to consider servers with multiple interfaces. The link bandwidth vector, ~K, is a vector of Link Aggregation Factors, one for each level in the EGFT. The top switches vector, ~C, includes the number of top switches at each level of the EGFT. The EGFT may be represented as EGFT (L, ~M, ~C, ~K) where ~M, ~C, ~K are vectors of size L. The total number of switches, S, number of servers, N, and number of links, W, in a EGFT(L, ~M, ~C, ~K) can be computed as shown in Equations 1-3:

$$S = C_L + M_L(C_{L-1} + M_{L-1}( \ldots (C_3 + M_3(C_2 + M_2)) \ldots )) \quad (1)$$

$$N = \Pi_{i=1}^{L} M_i \quad (2)$$

$$W = C_L M_L K_L + M_L(C_{L-1} M_{L-1} K_{L-1} + M_{L-1}( \ldots (C_2 M_2 K_2 + M_2(M_1)) \ldots )) \quad (3)$$

At a level I of EGFT(L, ~M, ~C, ~K), each of the $C_I$ top switches provides $M_I K_I$ bandwidth to all the terminal servers in that module. Hence, the oversubscription ratio at level I, which is a fraction of the number of terminals in a level I module to the bandwidth provided by the top switches, may be represented as shown in Equation 4:

$$O_I = \frac{\prod_{i=1}^{I} M_i}{c_I M_I K_I} \quad (4)$$

The oversubscription ratio O of a EGFT(L, ~M, ~C, ~K) is represented in Equation 5:

$$O = \max_{I=1}^{L} O_I \quad (5)$$

The bisection bandwidth is equal to the number of nodes, N, divided by the oversubscription ratio, O, and the maximum number of hops between any two servers is the number of levels, L, multiplied by 2.

Figure 3:
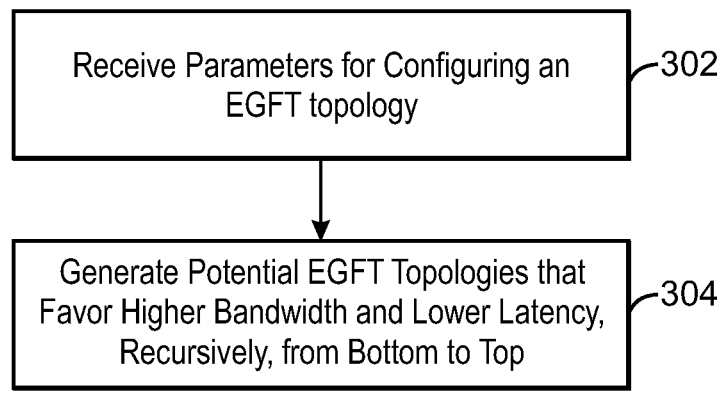
FIG. 3 is a process flow diagram of a method for generating potential EGFT topologies in accordance with embodiments.

FIG. 3 is a process flow diagram of a method 300 for generating potential EGFT topologies in accordance with embodiments. It should be understood that the data flow diagram is not intended to indicate a particular order of execution. The method begins at block 302, where the parameters 106 are received. The parameters 106 may include the number of servers 206, the number of switches 202 available for the EGFT 104, and the number of ports in each switch. In one embodiment, a threshold may be specified for the bisection bandwidth, below which all potential EGFTs may be eliminated from consideration. For instance, setting this threshold to 1 outputs only the EGFTs with full bisection bandwidth.

At block 304, the EGFT generator 102 may generate potential EGFT topologies based on heuristics that favor higher bandwidth and lower latency. Each of the potential EGFT topologies, may be generated recursively, and from the bottom level to the top. The bottom level refers to the level of the EGFT 104 directly connected to the servers. The top level refers to the level with no further uplinks. In one embodiment, various heuristics may be applied to reduce the number of EGFTs 104 that are generated. Some heuristics may be applied at the top level of the EGFT 104, while other heuristics may be applied at lower levels of the EGFT 104, or at any level. In one example heuristic that may be applied at the top level of the EGFT 104, the potential EGFTs may be limited to those that use a highest maximum LAG factor. In other words, if all modules are being aggregated (i.e., $M_{I+1}$=the number of modules at the level I), to minimize oversubscription, only the maximum possible value for $K_{I+1}$ is considered.

In an example of a heuristic that may be applied at any level, any potential EGFTs that achieve a lower oversubscription ratio than that of the lower levels is eliminated from the potential EGFTs. It is noted that the oversubscription ratio of a topology is the maximum ratio across all levels. As such, when generating an EGFT 104, no assignments of M, C, and K are considered at a level that can achieve a lower ratio than has already been imposed by choices at the lower levels.

Another heuristic may be used to stop adding further levels to the EGFT 104 if all low level modules can be combined into a single next-level module. If all modules at a level can be aggregated into one module, i.e., the switch radix R is greater than the number of modules at a level, the maximum aggregation size may be used instead of smaller sizes. Smaller aggregation sizes increase the number of levels, consuming more switches and links without improving bisection bandwidth.

In another example of a heuristic that may be applied at the top level, the number of switches used is limited to an amount that covers the uplinks from the next lower level. At the top-most level, the maximum possible and available top switches that use all uplinks at the next lower level are included, instead of iterating over all possible values for C.

The method 300 is parallelizable and can use large compute clusters. This makes it possible to do thorough "what-if" analyses. Such analyses can be useful in making designs future-proof, in figuring out the right parts to stock, and to minimize costs such as those associated with maintaining Stock Keeping Units (SKUs).

Figure 4:
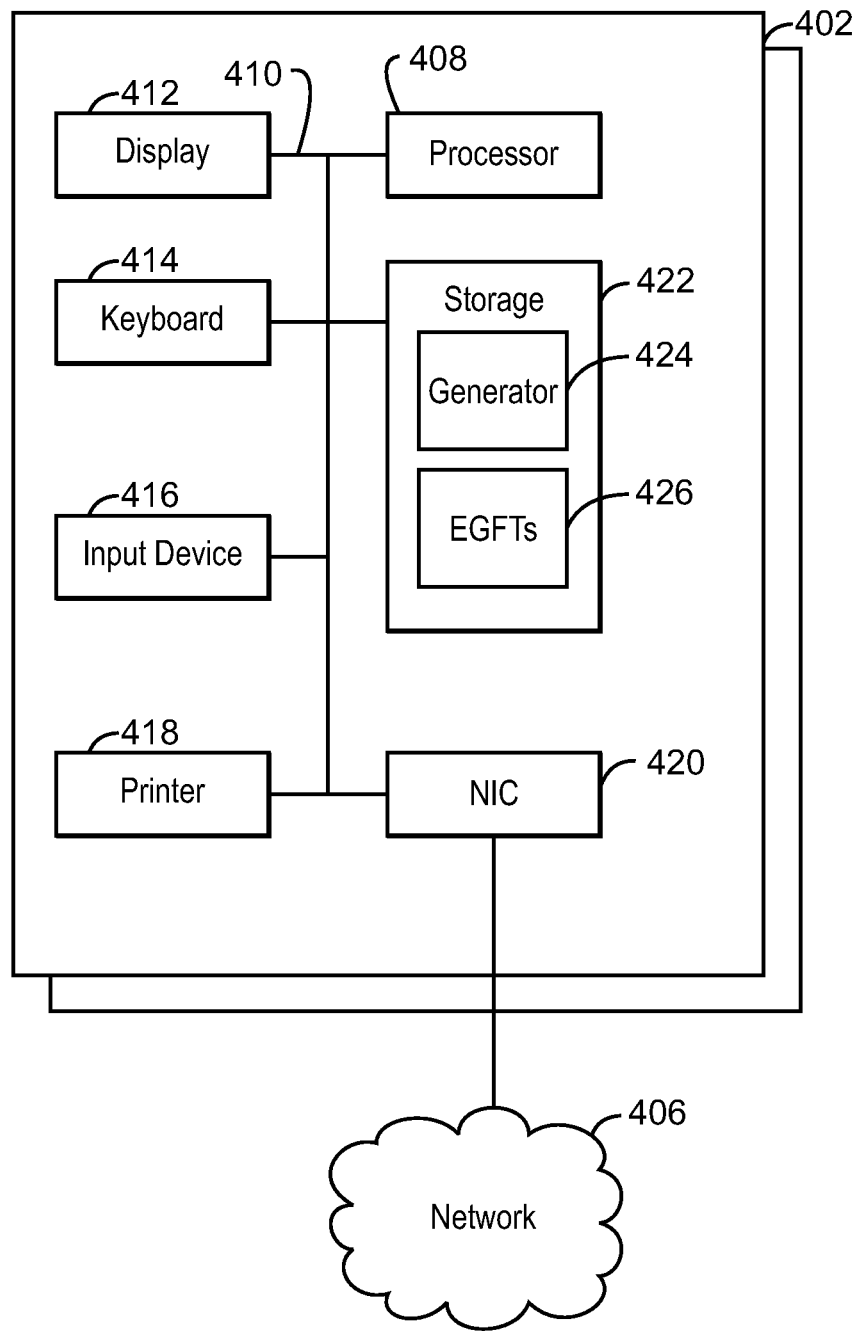
FIG. 4 is a block diagram of a system for generating potential EGFT topologies in accordance with embodiments.

FIG. 4 is a block diagram of a system 400 for generating EGFTs in accordance with embodiments. The functional blocks and devices shown in FIG. 4 may comprise hardware elements, software elements, or some combination of software and hardware. The hardware elements may include circuitry. The software elements may include computer code stored on a non-transitory, computer-readable medium. Additionally, the functional blocks and devices of the system 400 are but one example of functional blocks and devices that may be implemented in an embodiment. Specific functional blocks may be defined based on design considerations for a particular electronic device.

The system 400 may include servers 402 in communication with a network 406. In embodiments, the servers 402 may be organized in compute clusters, and perform the method 300 in parallel. Each of the servers 402 may include a processor 408, which may be connected through a bus 410 to a display 412, a keyboard 414, an input device 416, and an output device, such as a printer 418. The input devices 416 may include devices such as a mouse or touch screen. The servers 402 may also be connected through the bus 410 to a network interface card 420. The network interface card 420 may connect the servers 402 to the network 406. The network 406 may be a local area network, a wide area network, such as the Internet, or another network configuration. The network 406 may include routers, switches, modems, or any other kind of interface device used for interconnection. In one example embodiment, the network 406 may be the Internet.

The servers 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory.

The storage 422 may include the machine readable instructions used in embodiments of the present techniques. In an embodiment, the storage 422 may include an EGFT generator 424 and EGFTs 426. Given switches with a radix, R, the EGFT generator 424 generates an EGFT(L, ~M, ~C, ~K) if the following constraints hold. The top-most switches (level L top switches) have enough ports to connect to all $M_L$ L−1 EGFTs with $K_L$ links. Further, at each level 1<I<L, a top switch has enough ports to connect to all $M_I$ I−1 EGFTs with $K_I$ links, along with the ports to connect to the top switches at the I+1 level, i.e., "uplinks." It is noted that there are $C_{I+1}$ top switches at level I+1 with $K_{I+1}$ downlinks, and the $C_I$ top switches have enough uplink ports to account for those downlinks.

Figure 5:
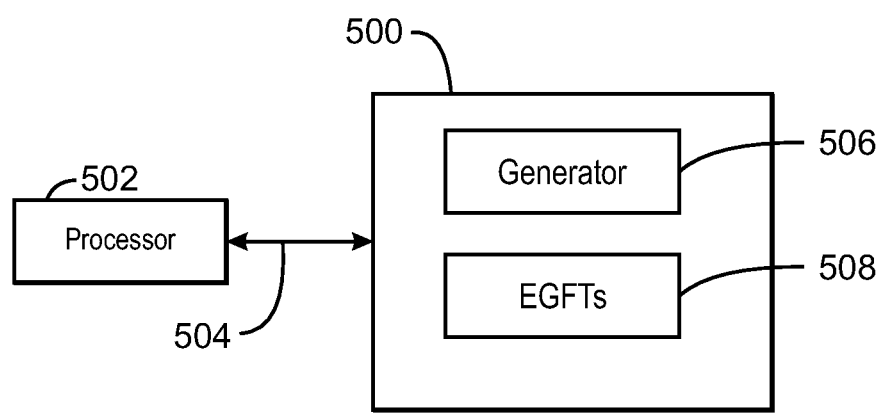
FIG. 5 is a block diagram showing a non-transitory, computer-readable medium that stores code for generating potential EGFT topologies in accordance with embodiments.

FIG. 5 is a block diagram showing a non-transitory, computer-readable medium that stores code for generating EGFTs in accordance with embodiments. The non-transitory, computer-readable medium is generally referred to by the reference number 500.

The non-transitory, computer-readable medium 500 may correspond to any typical storage device that stores computer-implemented instructions, such as programming code or the like. For example, the storage device may include a hard disk drive, a magnetic disk drive, e.g., to read from or write to a removable magnetic disk, or an optical disk drive, e.g., for reading a CD-ROM disk or to read from or write to other optical media. Further, other types of media that are readable by a computer system and that are suitable to the desired end purpose may be used, such as magnetic cassettes, flash memory cards, digital video disks, Bernoulli cartridges, and the like.

The storage device may be connected to a system bus by a storage device interface, such as a hard disk drive interface, a magnetic disk drive interface, or an optical drive interface. For example, the storage device may be the storage 422 discussed with respect to FIG. 4.

When read and executed by a processor 502 via a communication path 504, the instructions stored on the non-transitory, computer-readable medium 500 are adapted to cause the processor 502 to generate a set of EFGTs 508 according to an example embodiment, as described herein. The non-transitory, computer-readable medium 500 may include an EGFT generator 506, and EGFTs 508. The EGFT generator 506 may generate a reduced set of potential EGFTs 508 based on heuristics that favor high bandwidth and low latency.

What is claimed is:

1. A method performed by a computer processor, the method comprising:
   receiving parameters that specify a number of servers, a number of switches, and a number of ports in the switches, for configuring an extended generalized fat tree network (EGFT) topology; and
   generating a plurality of potential EGFT topologies based on the parameters and based on heuristics that favor higher bandwidth and lower latency, wherein generating the plurality of potential EGFT topologies comprises generating each level of the potential EGFT topologies recursively and from a bottom level of a potential EGFT topology to a top level.

2. The method recited in claim 1, comprising configuring an EGFT network topology based on one of the potential EGFT topologies.

3. The method recited in claim 1, wherein the heuristics comprise generating the top level with a maximum link aggregation (LAG) factor.

4. The method recited in claim 1, wherein the heuristics comprise generating levels of the potential EGFTs that achieve an oversubscription ratio equal to or greater than that of levels below the generated levels.

5. The method recited in claim 1, wherein the heuristics comprise assigning a current level of a potential EGFT to the top level if all low level modules can be combined into a single tree.

6. The method recited in claim 1, wherein the heuristics comprise generating a top level wherein a number of switches specified is limited to an amount that covers all uplinks from a next lower level.

7. The method recited in claim 1, wherein the parameters comprise a bisection bandwidth threshold, wherein the potential EGFTs comprise a bisection bandwidth greater than or equal to the bisection bandwidth threshold.

8. The method recited in claim 1, wherein the potential EGFTs comprise:
   a plurality of parameterized levels;
   a plurality of link aggregation factors at each of the parameterized levels;
   a number of modules aggregated at each of the parameterized levels; and
   a number of top switches aggregated at each of the parameterized levels.

9. A computer system for generating a plurality of potential extended generalized fat trees, comprising:
   a memory storing instructions;
   a processor configured to execute the instructions to:
   receive parameters that specify a number of servers, a number of switches, and a number of ports in the switches, for configuring an extended generalized fat tree network (EGFT) topology; and
   generate a plurality of potential EGFT topologies based on the parameters, and based on heuristics that favor higher bandwidth and lower latency, wherein generating the plurality of potential EGFT topologies comprises by generating each level of the potential EGFT topologies recursively and from a bottom level of a potential EGFT topology to a top level, wherein the potential EGFTs comprise:
   a plurality of parameterized levels;
   a plurality of link aggregation factors at each of the parameterized levels; and
   a number of top switches aggregated at each of the parameterized levels.

10. The computer system recited in claim 9, wherein the heuristics comprise generating the top level with a maximum link aggregation (LAG) factor.

11. The computer system recited in claim 9, wherein the heuristics comprise generating levels of the potential EGFTs that achieve an oversubscription ratio equal to or greater than that of levels below the generated levels.

12. The computer system recited in claim 9, wherein the heuristics comprise assigning a current level of a potential EGFT to the top level if all low level modules can be combined into a single tree.

13. The computer system recited in claim 9, wherein the heuristics comprise generating a top level wherein a number of switches specified is limited to an amount that covers all uplinks from a next lower level.

14. The computer system recited in claim 9, wherein the parameters comprise a bisection bandwidth threshold, wherein the potential EGFTs comprise a bisection bandwidth greater than or equal to the bisection bandwidth threshold.

15. A non-transitory, computer-readable medium comprising machine-readable instructions executable by a processor to:
   receive parameters that specify a number of servers, a number of switches, and a number of ports in the switches, for configuring an extended generalized fat tree network (EGFT) topology; and generate a plurality of potential EGFT topologies based on the parameters, and based on heuristics that favor higher bandwidth and lower latency, wherein generating the plurality of potential EGFT topologies comprises generating each level of the potential EGFT topologies recursively and from a bottom level of a potential EGFT topology to a top level, wherein the parameters comprise a bisection bandwidth threshold, and wherein the potential EGFTs comprise a bisection bandwidth greater than or equal to the bisection bandwidth threshold.

16. The non-transitory, computer-readable medium recited in claim 15, wherein the potential EGFTs comprise:
a plurality of parameterized levels;
a plurality of link aggregation factors at each of the parameterized levels;
a number of modules aggregated at each of the parameterized levels; and
a number of top switches aggregated at each of the parameterized levels.

17. The non-transitory, computer-readable medium recited in claim 16, wherein the heuristics comprise generating the top level with a maximum link aggregation (LAG) factor.

18. The non-transitory, computer-readable medium recited in claim 17, wherein the heuristics comprise generating levels of the potential EGFTs that achieve an oversubscription ratio equal to or greater than that of levels below the generated levels.

19. The non-transitory, computer-readable medium recited in claim 18, wherein the heuristics comprise assigning a current level of a potential EGFT to the top level if all low level modules can be combined into a single tree.

20. The non-transitory, computer-readable medium recited in claim 19, wherein the heuristics comprise generating a top level wherein a number of switches specified is limited to an amount that covers all uplinks from a next lower level.

* * * * *